United States Patent
Chang (12) United States Patent (10) Patent No.: US 10,737,745 B2
(45) Date of Patent: Aug. 11, 2020

(54) DOUBLE LINKAGE SAFETY BRAKE SYSTEM

(71) Applicant: GINDA NEW-TECH CO., LTD., Kaohsiung (TW)

(72) Inventor: Jui-Lung Chang, Kaohsiung (TW)

(73) Assignee: GINDA NEW-TECH CO., LTD., Kaohsiung (TW)

( * ) Notice: Subject to any disclaimer, the term of this patent is extended or adjusted under 35 U.S.C. 154(b) by 0 days.

(21) Appl. No.: 16/340,680

(22) PCT Filed: Oct. 11, 2016

(86) PCT No.: PCT/CN2016/101736
§ 371 (c)(1),
(2) Date: Apr. 9, 2019

(87) PCT Pub. No.: WO2018/068194
PCT Pub. Date: Apr. 19, 2018

(65) Prior Publication Data
US 2019/0232929 A1 Aug. 1, 2019

(51) Int. Cl.
*B62L 3/08* (2006.01)
*B62L 3/02* (2006.01)
(Continued)

(52) U.S. Cl.
CPC .................... *B62L 3/08* (2013.01);
*B60T 7/08* (2013.01); *B60T 7/10* (2013.01);
*B60T 7/102* (2013.01);
(Continued)

(58) Field of Classification Search
CPC .................... B62L 3/08; B62L 3/02
See application file for complete search history.

(56) References Cited

U.S. PATENT DOCUMENTS 6,098,488 A * 8/2000 Vos ..................... B62L 3/02
74/489
6,298,744 B1 10/2001 Huang

FOREIGN PATENT DOCUMENTS

| CN | 201472592 U | 5/2010 |
| CN | 201559783 U | 8/2010 |

(Continued)

OTHER PUBLICATIONS

The International Search Report of International application No. PCT/CN2016/101736, dated Jul. 5, 2017.

*Primary Examiner* — Luis A Gonzalez
(74) *Attorney, Agent, or Firm* — J.C. Patents (57) ABSTRACT

This invention relates to a double linkage safety brake system, which includes at least a brake handle, a base, a rear wheel brake wire, a front wheel brake line, a rear wheel brake and a front wheel brake. Said brake handle is provided with a first connecting rod and a second connection rod, the driving arm of brake handle is provided with a first shaft hole and a second shaft hole, the second shaft hole is an arc-shaped elongated hole, the distance between the first shaft hole and the shaft 200 is smaller than the distance between the second shaft hole and the shaft. A first support shaft is pivoted between the first shaft hole and the first connecting rod, and the outer side of the first connecting rod is connected to said rear wheel brake wire. A second support shaft is pivoted between the second shaft slot and the second connecting rod, and the outer side of the second connecting rod is connected to the front wheel brake wire. In this way, the driver only needs to press the brake once to output a time difference braking force by the first connecting rod and the second connecting rod, and the rear wheel brake and the front wheel brake can generate a time difference braking action; furthermore, the moving arc length of the second connecting rod is greater than the moving arc length of the (Continued)

first connecting rod when the driving arm rotates, so the braking force generated by the second connecting rod is greater than the braking force of the first connecting rod, and the braking force of the front wheel brake is greater than the braking force of the rear wheel brake, to achieve the purpose of safe braking, and can prevent accidents caused by the driver start the front wheel brake first.

6 Claims, 9 Drawing Sheets

(51) Int. Cl.
    *B60T 7/10*     (2006.01)
    *B60T 7/08*     (2006.01)

(52) U.S. Cl.
    CPC ............. *B62L 3/02* (2013.01); *B60Y 2200/12* (2013.01); *B60Y 2200/13* (2013.01)

(56) References Cited

FOREIGN PATENT DOCUMENTS

| CN | 102398663 A | | 4/2012 |
|---|---|---|---|
| CN | 203450300 U | | 2/2014 |
| JP | H05-16862 A | | 1/1993 |
| JP | 08328679 A | * | 12/1996 |
| KR | 20180103636 A | * | 9/2018 |

* cited by examiner

DOUBLE LINKAGE SAFETY BRAKE SYSTEM

BACKGROUND OF THE INVENTION

1. Field of the Invention

This invention relates to a double linkage safety brake system, particularly to an innovative brake system that allows various types of vehicles to immediately activate the rear wheel brake and simultaneously activate the front wheel brake within a time difference through a single braking action of the driver. When the driver increases the braking force, the braking force output by the front wheel brakes will be greater than the braking force output by the rear wheel brakes to improve the braking performance and safety of the vehicle.

2. Description of the Prior Art

Figure 1:
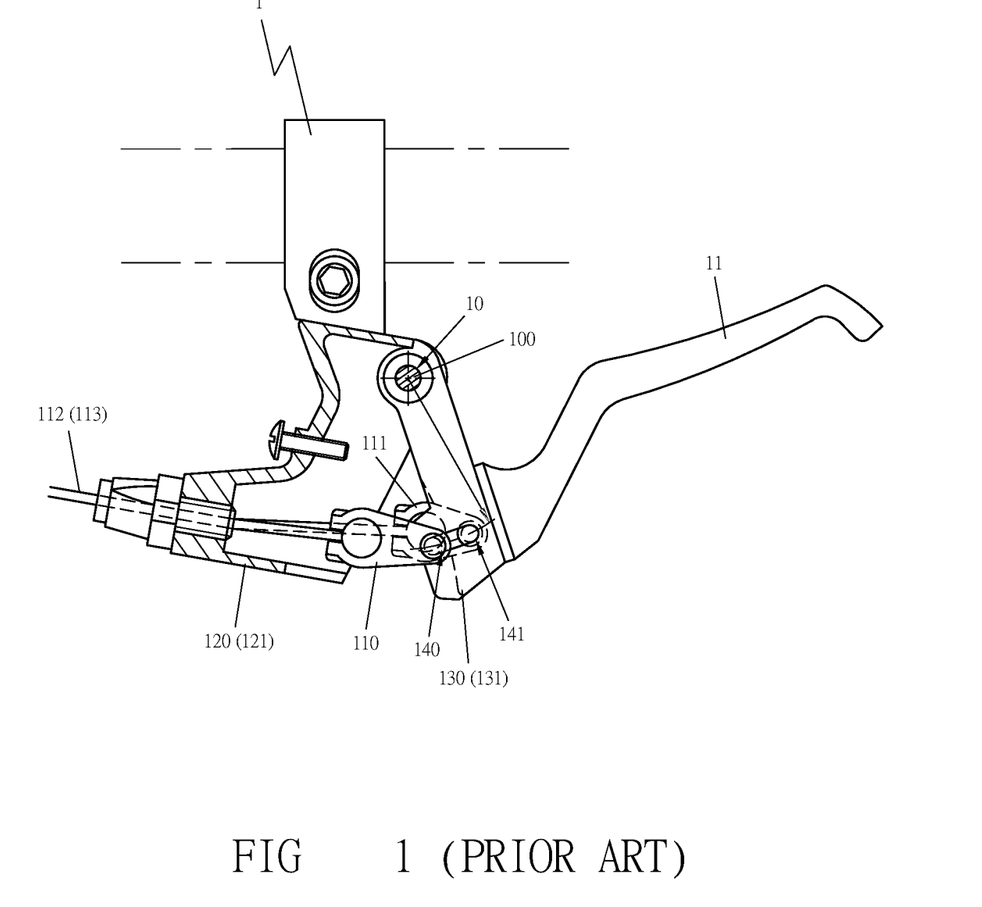
FIG. 1 is a schematic view of the brake handle of the traditional two-wheeled vehicle.

As shown in FIG. 1, it shows a brake handle of a traditional two-wheeled vehicle. The body 1 of the brake handle is provided with a shaft hole 10, and a handle 11 is pivotally mounted on the shaft hole 10 of the body 1 through a shaft 100. The handle 11 is provided with a first traction seat 110 and a second traction seat 111 which are arranged side by side, the first traction seat 110 and the second traction seat 111 are respectively connected with a front wheel brake wire 112 and a rear wheel brake wire 113, and the body 1 is provided with a front wheel brake guide 120 and a rear wheel brake guide 121. The handle 11 is provided with a front wheel brake pulling portion 130 and a rear wheel brake pulling portion 131, the front wheel brake pulling portion 130 is provided with a first shaft hole 140, and the rear wheel brake pulling portion 131 is provided with a second shaft hole 141, the distance from the first shaft hole 140 to the support shaft 100 is equal to the distance from the second shaft hole 141 to the support shaft 100. Thus, when the driver activates the handle, the first and second traction seats 110, 111 will simultaneously pull the front and rear wheel brake wires 112, 113 to control the braking operation of the front and rear wheels at the same time.

However, no matter how the driver increases the braking force, the first and second traction seats 110, 111 will synchronously output the same braking force to the rear and front wheel brake, this will affects the safety of the brake and the braking efficiency is very poor.

For this reason, the inventor of this invention, having much experience in designing and manufacturing brake device and its related products, understands and researches the brake problems of traditional two-wheeled vehicle and hence devised this invention.

SUMMARY OF THE INVENTION

The objective of this invention is to offer a double linkage safety brake system with first decelerate and then stop function, it can improve braking performance, safety and stability of the vehicle by using brake technology with time difference. When the driver presses the brake handle with a small force, the first support shaft of the driving arm will drive the first connecting rod to move a distance to output a braking force to the rear wheel brake; at this time, the second support shaft will moves a distance and moves from the right side of the arc-shaped elongated hole of the second shaft hole to the left side, and the second connecting rod will not output any braking force to the front wheel brake; when the driver increases the force of pressing the brake handle, the second support shaft of the driving arm will start to drive the second connecting rod to move, and outputs a braking force to the front wheel brake. In this way, the driver only needs to press the brake once to output a time difference braking force by the first connecting rod and the second connecting rod, and the rear wheel brake and the front wheel brake can generate a time difference braking action.

The double linkage safety brake system in the present invention at least comprising a brake handle, a base, a rear wheel brake wire, a front wheel brake line, a rear wheel brake and a front wheel brake. Said brake handle is provided with a driving arm, a shaft is arranged between the driving arm and the base, said base is mounted on the steering rod of the vehicle. Said brake handle is provided with a first connecting rod and a second connecting rod, said driving arm is provided with a first shaft hole and a second shaft hole, the second shaft hole is an arc-shaped elongated hole, the distance between the first shaft hole and the shaft is smaller than the distance between the second shaft hole and the shaft; a first support shaft is pivoted between the first shaft hole and the first connecting rod, and the outer side of the first connecting rod is connected to said rear wheel brake wire. A second support shaft is pivoted between the second shaft slot and the second connecting rod, and the outer side of the second connecting rod is connected to the front wheel brake wire.

The double linkage safety brake system in the present invention, among which the moving arc length of the second connecting rod is greater than the moving arc length of the first connecting rod, so the braking force generated by the second connecting rod is greater than the braking force of the first connecting rod, and the braking force of the front wheel brake that is activated later is greater than the braking force of the rear wheel brake that is activated first.

The double linkage safety brake system in the present invention, among which the vehicle can be mounted with one set or two sets of brake systems, the driver can operate the brake handles separately to separately or simultaneously output brake force to the rear wheel brake, and output the brake force to the front wheel brake within a time difference.

BRIEF DESCRIPTION OF DRAWINGS

This invention will be better understood by referring to the accompanying drawings, wherein.

DETAILED DESCRIPTION OF THE PREFERRED EMBODIMENT

As shown in FIGS. 1 to 11, the double linkage safety brake system in the present invention includes at least a brake handle 2, a base 3, a rear wheel brake wire 40, a front wheel brake line 41, a rear wheel brake 50 and a front wheel brake 51 as main components combined together.

Figure 2:
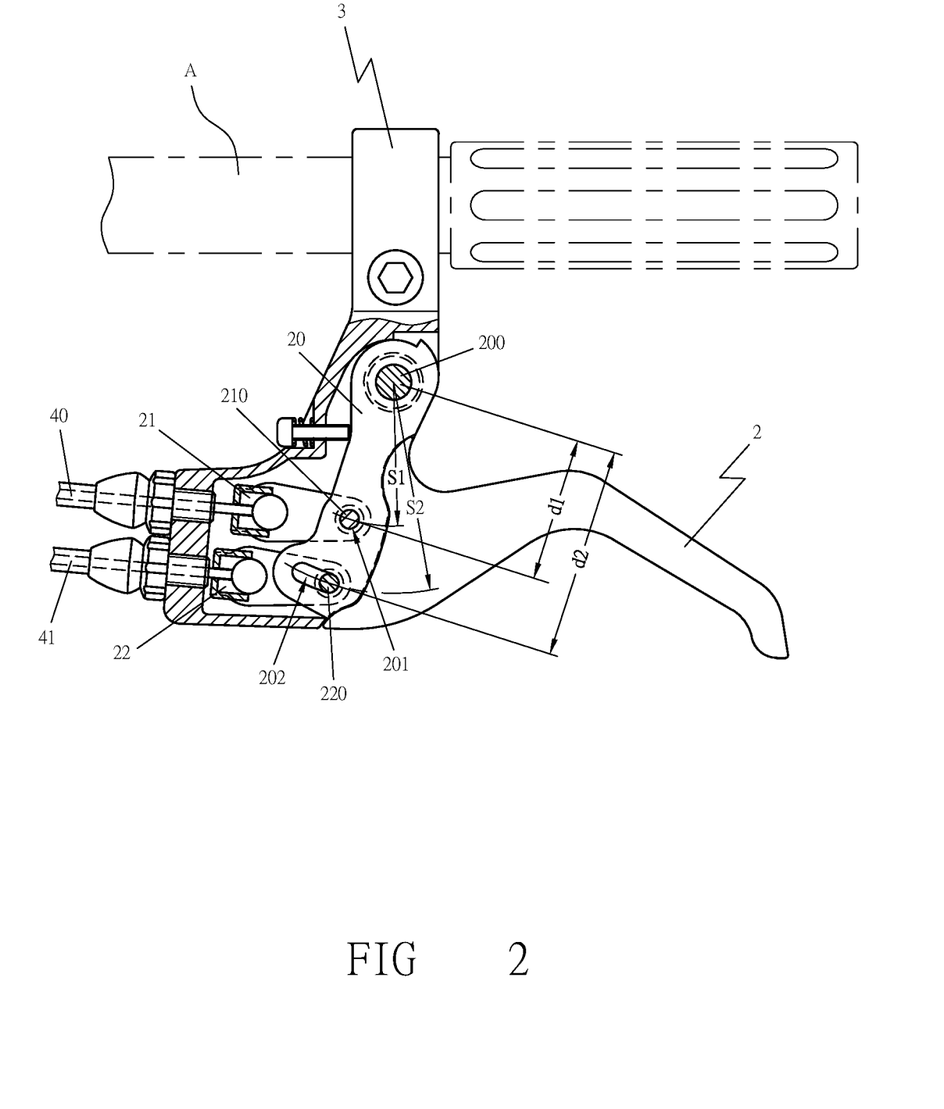
FIG. 2 is a first schematic view of the operating state of the brake system in the present invention, and showing a state in which the brake handle is not be activated.
Figure 3:
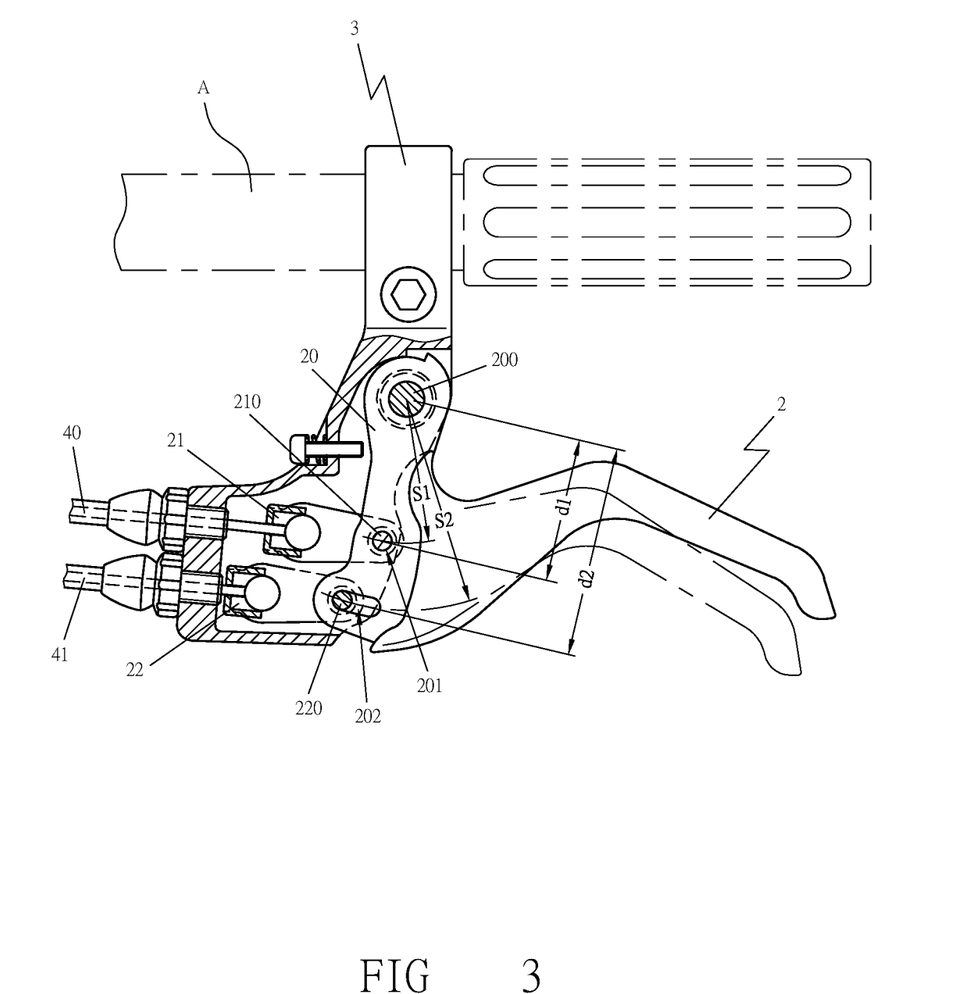
FIG. 3 is a second schematic view of the operating state of the brake system in the present invention, and showing a state in which the brake handle outputs the first braking force.
Figure 4:
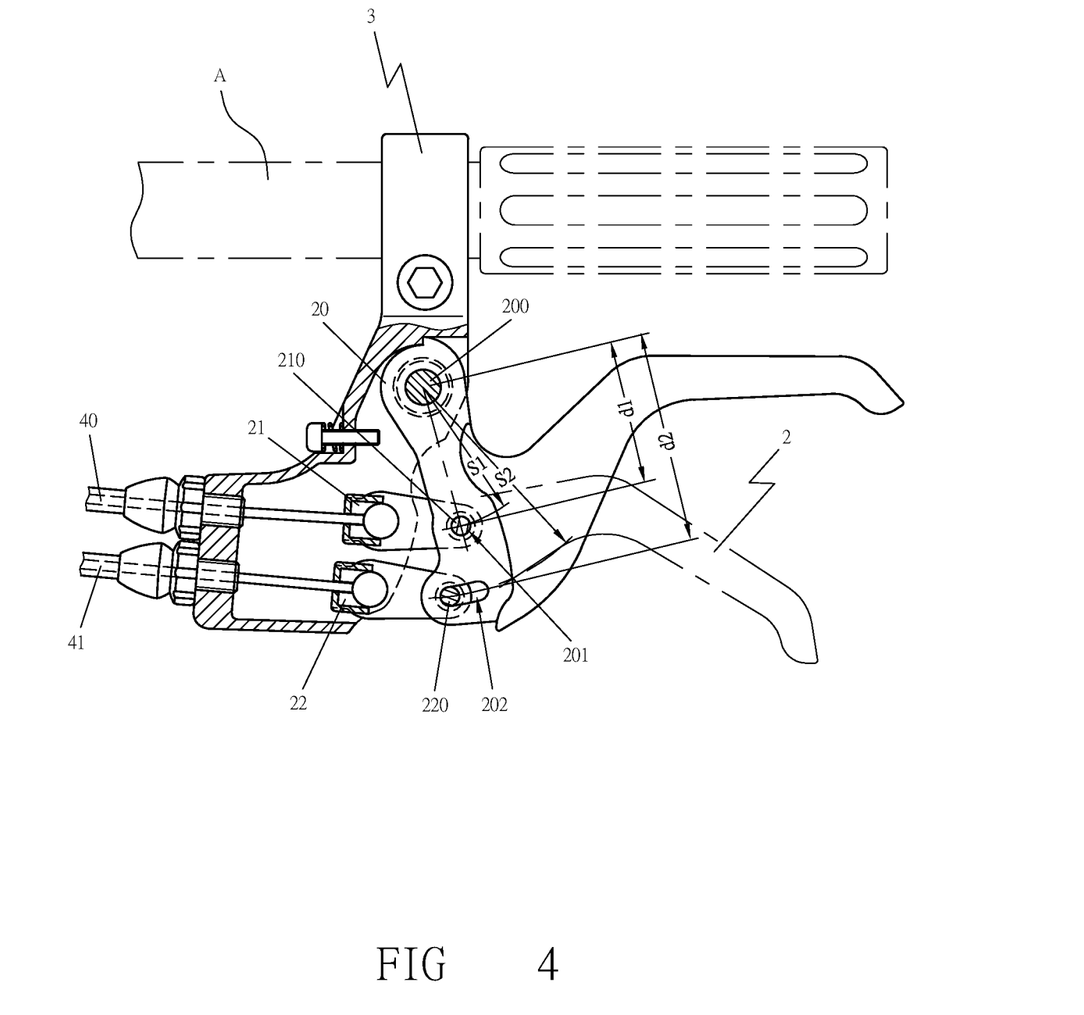
FIG. 4 is a third schematic view of the operating state of the brake system in the present invention, and showing a state in which the brake handle outputs the second braking force.

As shown in FIGS. 2 to 4, said brake handle 2 is provided with a driving arm 20, a shaft 200 is arranged between the driving arm 20 and the base 3, said base 3 is mounted on the steering rod A of the vehicle. Said driving arm 20 is provided with a first shaft hole 201 and a second shaft hole 202, the second shaft hole is an arc-shaped elongated hole, the distance d1 between the first shaft hole 201 and the shaft 200 is smaller than the distance d2 between the second shaft hole 202 and the shaft 200. In this way, when the driving arm 20 rotates, the moving arc length S1 of the first shaft hole 201 is smaller than the moving arc length S2 of the second shaft hole 202, and the moving arc length S2 of the second connecting rod 22 is greater than the moving arc length S1 of the first connecting rod 21, this will enable the first connecting rod 21 and the second connecting rod 22 to output different braking forces.

Figure 5:
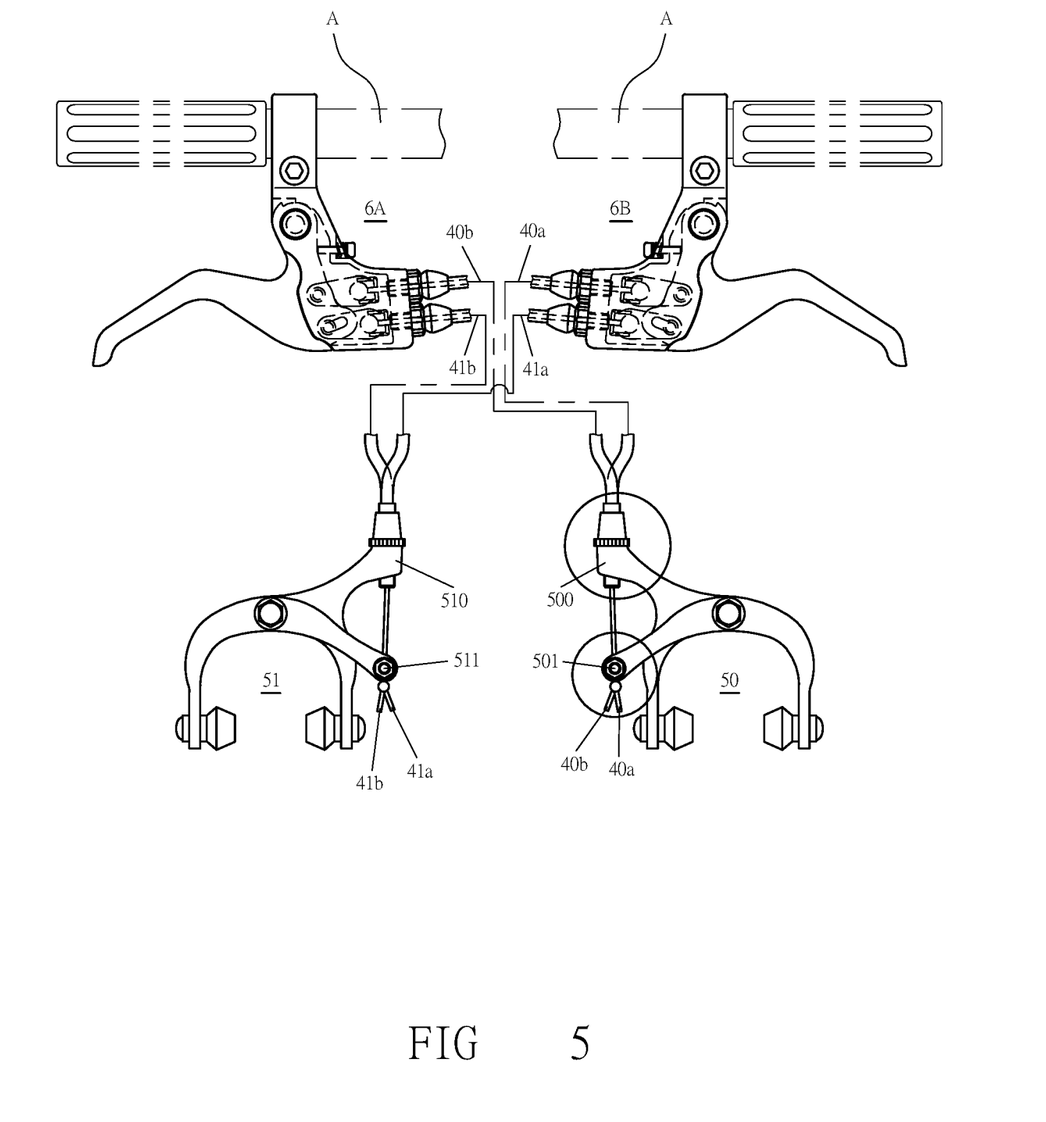
FIG. 5 is a schematic view of the first embodiment in the present invention, and showing two set of brake systems.
Figure 10:
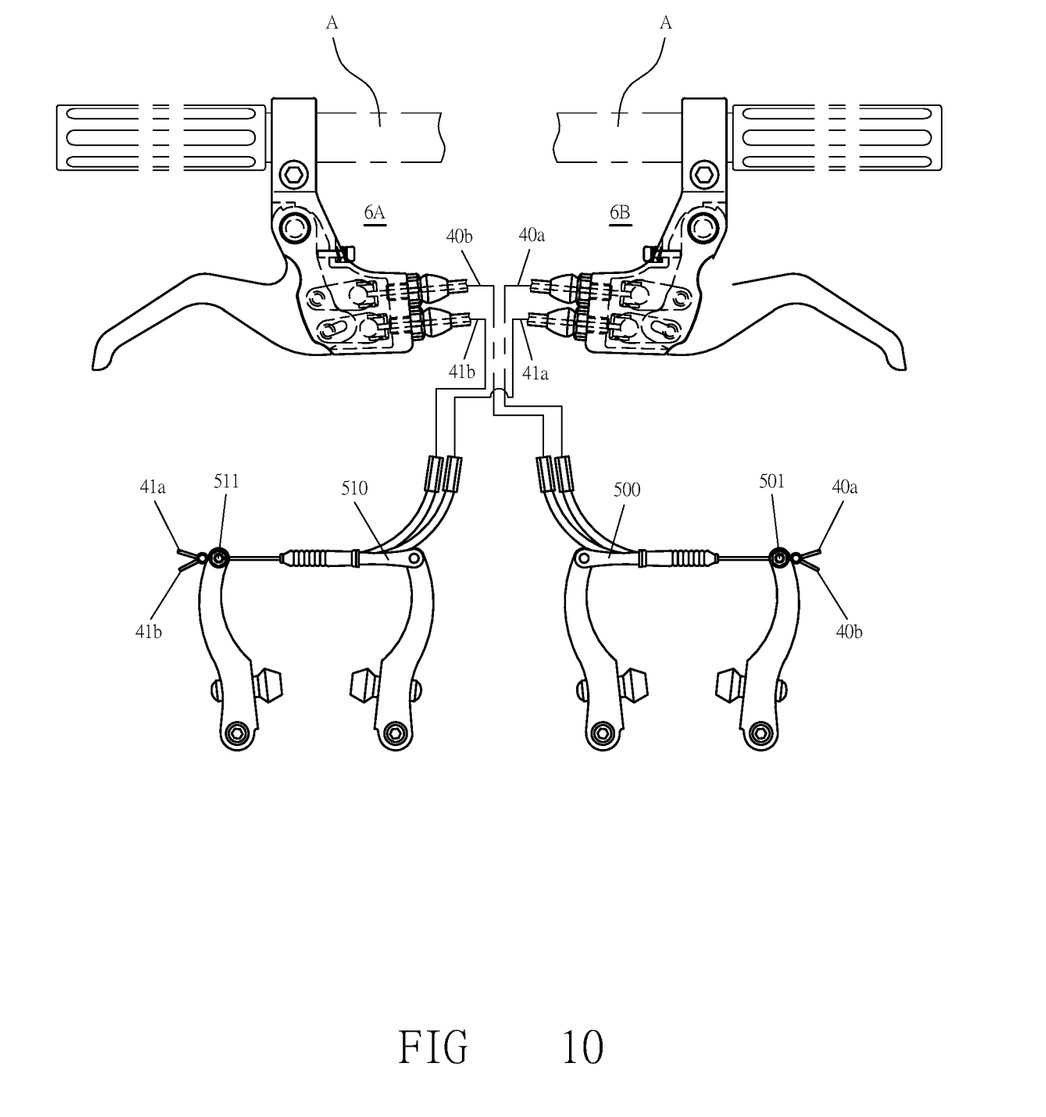
FIG. 10 is a schematic view of the second embodiment in the present invention, and showing two set of brake systems.
Figure 11:
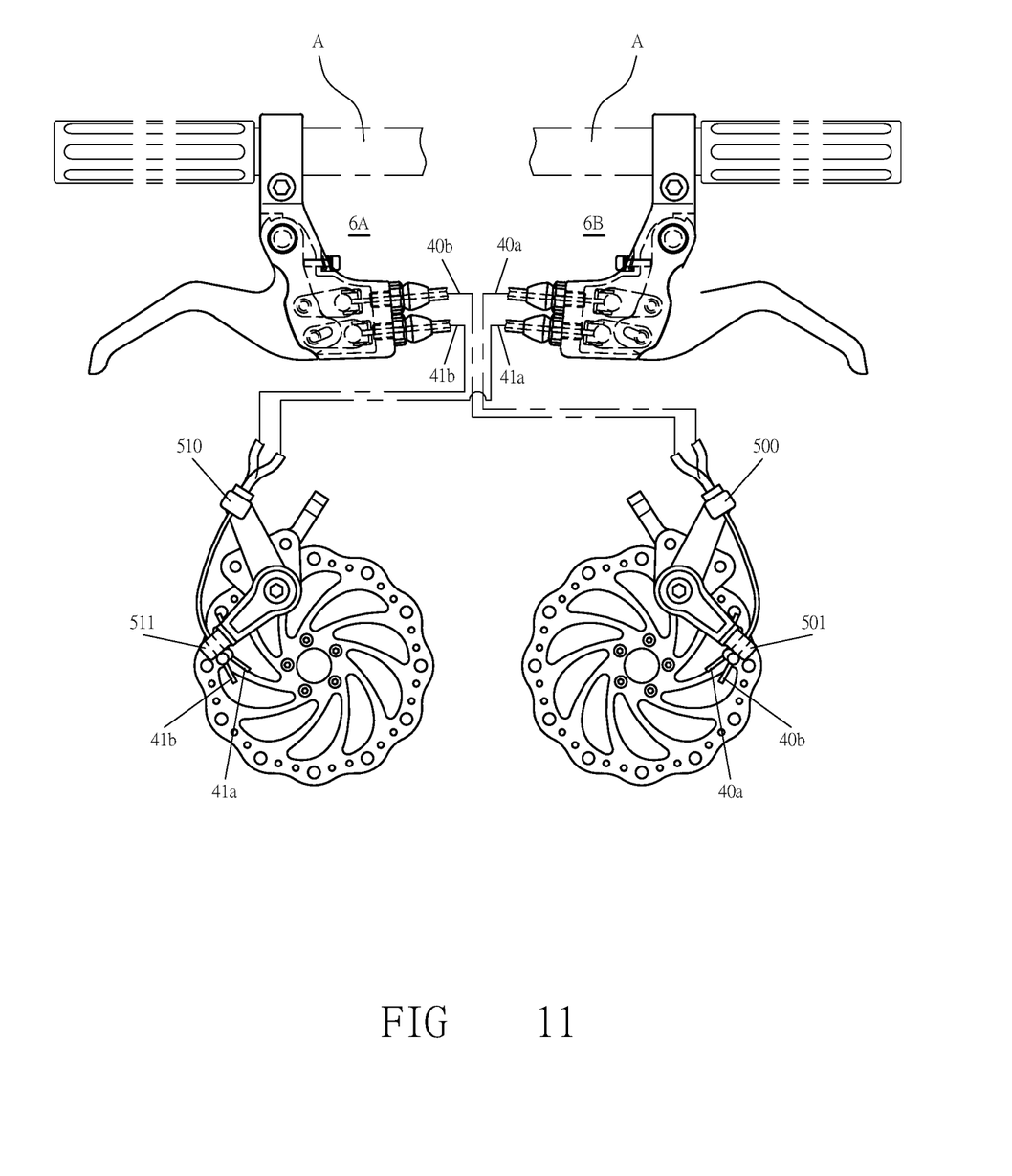
FIG. 11 is a schematic view of the third embodiment in the present invention, and showing two set of brake systems.

As shown in FIGS. 2 to 4, said brake handle 2 is provided with a first connecting rod 21 and a second connecting rod 22, a first support shaft 210 is pivoted between the first shaft hole 201 and the first connecting rod 21, and the outer side of the first connecting rod 21 is connected to said rear wheel brake wire 40, so that the first connecting rod 21 can transmit the braking force to the rear wheel brake 50 through the rear wheel brake wire 40 (as shown in FIGS. 5, 10 and 11). A second support shaft 220 is pivoted between the second shaft slot 202 and the second connecting rod 22, and the outer side of the second connecting rod 22 is connected to the front wheel brake wire 41, so that the second connecting rod 22 can transmit the braking force to the front wheel brake 51 through the front wheel brake wire 41.

As shown in FIG. 2, when the brake handle 2 is at rest, said first connecting rod 21 and second connecting rod 22 will not output any braking force to the rear wheel brake wire 40 and the front wheel brake wire 41, and the second support shaft 220 is located on the right side of the arc-shaped elongated hole of the second shaft hole 202.

As shown in FIG. 3, when the driver presses the brake handle 2 with a small force, the first support shaft 210 of the driving arm 20 will drive the first connecting rod 21 to move a distance to output a braking force to the rear wheel brake 50. At this time, the second support shaft 220 will moves a distance and moves from the right side of the arc-shaped elongated hole of the second shaft hole 202 to the left side, and the second connecting rod 22 will not output any braking force to the front wheel brake 51.

As shown in FIG. 4, When the driver increases the force of pressing the brake handle 2, the second support shaft 220 of the driving arm 20 will start to drive the second connecting rod 22 to move, and outputs a braking force to the front wheel brake 51. In this way, the driver only needs to press the brake once to output a time difference braking force by the first connecting rod 21 and the second connecting rod 22, and the rear wheel brake 50 and the front wheel brake 51 can generate a time difference braking action. Furthermore, the moving arc length S2 of the second connecting rod 22 is greater than the moving arc length S1 of the first connecting rod 21 when the driving arm 20 rotates, so the braking force generated by the second connecting rod 22 is greater than the braking force of the first connecting rod 21, and the braking force of the front wheel brake 51 is greater than the braking force of the rear wheel brake 50 to achieve the purpose of safe braking, and can prevent accidents caused by the driver start the front wheel brake 51 first.

Figure 6:
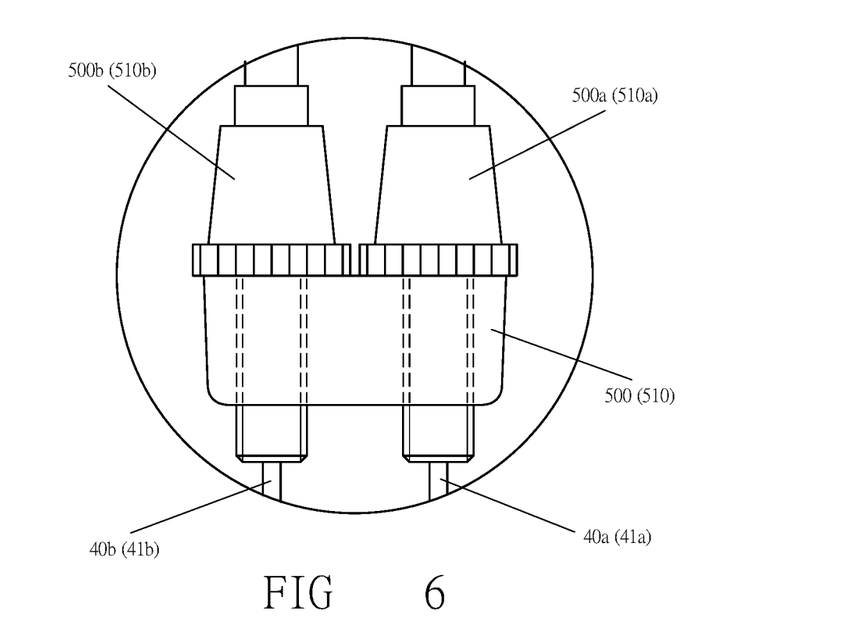
FIG. 6 is a partial enlarged view of the A area in FIG. 5.

The embodiments shown in FIGS. 5, 10, and 11 are the first embodiment, the second embodiment, and the third embodiment of the present invention mounted on a two-wheeled vehicle. In each embodiment, a first set of brake system 6A and a second set of brake system 6B are separately mounted on the steering rod A of the vehicle to produce a double interlocking brake action. Of course, this invention can only mount one set of brake system 6A on the vehicle according to the needs of use. The first set of brake system 6A and the second set of brake system 6B of the respective embodiments are respectively provided with rear wheel brake wires 40a, 40b, the rear wheel brake wires 40a, 40b are connected to the brake wire base 500 of the rear wheel brake 50, the brake wire base 500 is provided with a first wire bracket 500a and a second wire bracket 500b, respectively. In this way, each rear wheel brake wire 40a, 40b can be operated independently, and avoid the rear wheel brake wires from interfering with each other (as shown in FIG. 6).

The first set of brake system 6A and the second set of brake system 6B of the respective embodiments are respectively provided with front wheel brake wires 41a, 41b, the front wheel brake wires 41a, 41b are connected to the brake wire base 510 of the front wheel brake 51, the brake wire base 510 is provided with a first wire bracket 510a and a second wire bracket 510b, respectively. So that each front wheel brake wire 41a, 41b can be operated independently, and avoid the front wheel brake wires from interfering with each other (as shown in FIG. 6).

Figure 7:
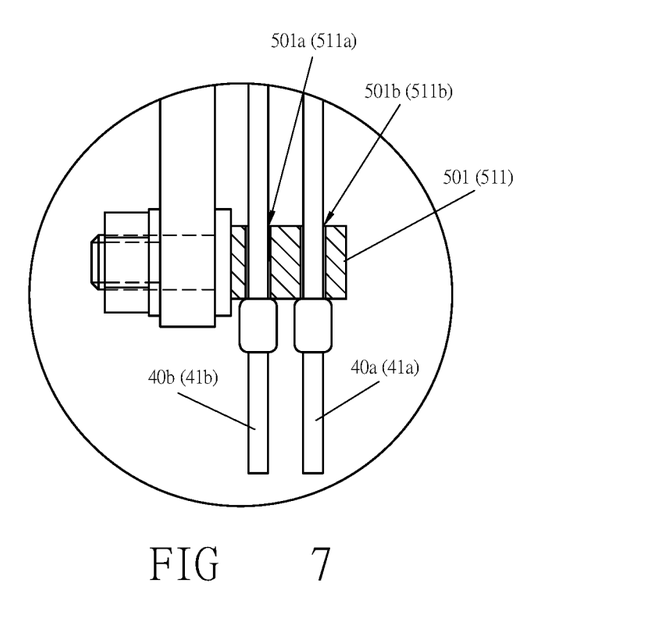
FIG. 7 is a partial enlarged view of the B area in FIG. 6.
Figure 8:
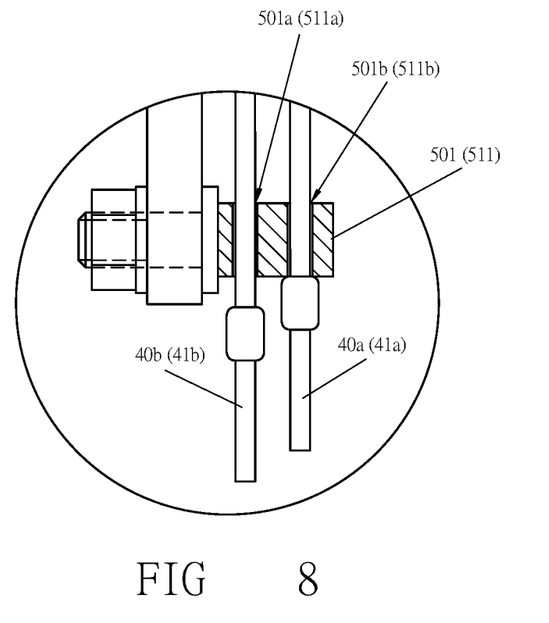
FIG. 8 is a first schematic view of the operating state in FIG. 7.
Figure 9:
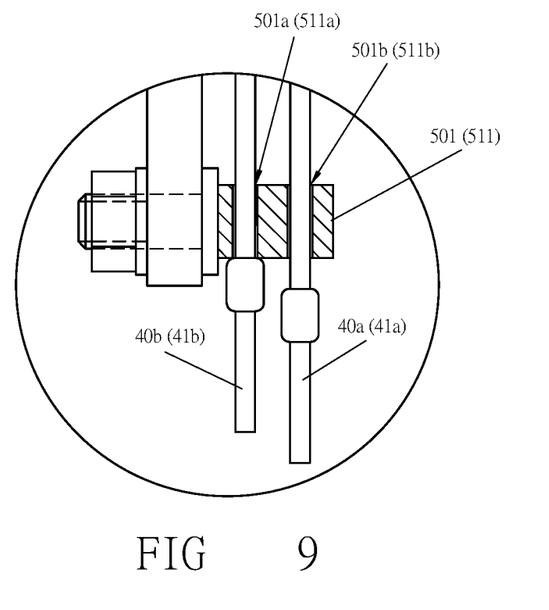
FIG. 9 is a second schematic view of the operating state in FIG. 7.

As shown in FIGS. 7, 8 and 9, said rear wheel brake 50 may be provided with a driving block 501, the driving block 501 is provided with a first through hole 501a and a second through hole 501b. The rear wheel brake wires 40a, 40b of the first set of brake system 6A and the second set of brake system 6B of said embodiments are respectively passed through said first through hole 501a and second through hole 501b, respectively. So that each rear wheel brake wire 40a, 40b can be operated independently, and avoid the rear wheel brake wires from interfering with each other.

As shown in FIGS. 7, 8 and 9, said front wheel brake 51 may be provided with a driving block 511, the driving block 511 is provided with a first through hole 511a and a second through hole 511b. The front wheel brake wires 41a, 41b of the first set of brake system 6A and the second set of brake system 6B of said embodiments are respectively passed through said first through hole 511a and second through hole 511b, respectively. So that each front wheel brake wire 41a, 41b can be operated independently, and avoid the rear wheel brake wires from interfering with each other.

Therefore, the present invention can be applied to various vehicles having a steering rod, such as a bicycle, a motorcycle, an electric scooter, or other vehicles. The driver only needs to press the brake once to output a time difference braking force by the first connecting rod 21 and the second connecting rod 22, and the rear wheel brake 50 and the front wheel brake 51 can generate a time difference braking action. Furthermore, the moving arc length S2 of the second connecting rod 22 is greater than the moving arc length 51 of the first connecting rod 21 when the driving arm 20 rotates, so the braking force generated by the second connecting rod 22 is greater than the braking force of the first connecting rod 21, and the braking force of the front wheel brake 51 that is activated later is greater than the braking force of the rear wheel brake 50 that is activated first, to achieve the purpose of safe braking, and can prevent accidents caused by the driver start the front wheel brake 51 first.

The double linkage safety brake system of the present invention is a safety system with first decelerate and then stop function, it can improve braking performance, safety and stability of the vehicle by using brake technology with time difference. Evidently this invention has tangible benefits and tallies with progressiveness and novelty demanded by patent laws. While the preferred embodiments of this invention have been described above, it will be recognized and understood that various modifications may be made therein and appended claims are intended to cover all such modifications that may fall within the spirit and scope of the invention.

What is claimed is:

1. A double linkage safety brake system at least comprising a brake handle 2, a base 3, a rear wheel brake wire 40, a front wheel brake line 41, a rear wheel brake 50 and a front wheel brake 51; wherein said brake handle 2 is provided with a driving arm 20, a shaft 200 is arranged between the driving arm 20 and the base 3, said base 3 is mounted on the steering rod A of the vehicle;

said brake handle 2 is provided with a first connecting rod 21, said driving arm 20 is provided with a first shaft hole 201 and a second shaft hole 202, the second shaft hole is an arc-shaped elongated hole, the distance dl between the first shaft hole 201 and the shaft 200 is smaller than the distance d2 between the second shaft hole 202 and the shaft 200; a first support shaft 210 is pivoted between the first shaft hole 201 and the first connecting rod 21, and an outer side of the first connecting rod 21 is connected to said rear wheel brake wire 40, so that the first connecting rod 21 can transmit the braking force to the rear wheel brake 50 through the rear wheel brake wire 40;

said brake handle 2 is provided with a second connecting rod 22, a second support shaft 220 is pivoted between the second shaft slot 202 and the second connecting rod 22, and an outer side of the second connecting rod 22 is connected to the front wheel brake wire 41, so that the second connecting rod 22 can transmit the braking force to the front wheel brake 51 through the front wheel brake wire 41;

when the driver presses the brake handle 2 with a small force, the first support shaft 210 of the driving arm 20 will drive the first connecting rod 21 to move a distance to output a braking force to the rear wheel brake 50; at this time, the second support shaft 220 moves a distance and moves from a right side of the second shaft hole 202 to a left side of the second shaft hole, and the second connecting rod 22 will not output any braking force to the front wheel brake 51; when the driver increases the force of pressing the brake handle 2, the second support shaft 220 of the driving arm 20 will start to drive the second connecting rod 22 to move, and outputs a braking force to the front wheel brake 51;

in this way, the driver only needs to press the brake once to output a time difference braking force by the first connecting rod 21 and the second connecting rod 22, and the rear wheel brake 50 and the front wheel brake 51 can generate a time difference braking action; furthermore, a moving arc length S2 of the second connecting rod 22 is greater than the moving arc length S1 of the first connecting rod 21 when the driving arm 20 rotates, so the braking force generated by the second connecting rod 22 is greater than the braking force of the first connecting rod 21, and the braking force of the front wheel brake 51 is greater than the braking force of the rear wheel brake 50, to achieve the purpose of safe braking, and can prevent accidents caused by the driver start the front wheel brake 51 first.

2. The double linkage safety brake system according to claim 1, wherein of the double linkage safety brake system includes a first set of brake system and a second set of brake system which are mounted on one vehicle system to output double linkage braking force.

3. The double linkage safety brake system according to claim 2, wherein said first set of brake system and second set of brake system are respectively provided with rear wheel brake wires, the rear wheel brake wires are connected to the brake wire base of the rear wheel brake, the brake wire base is provided with a first wire bracket and a second wire bracket, respectively; so that each rear wheel brake wire can be operated independently, and avoid the rear wheel brake wires from interfering with each other.

4. The double linkage safety brake system according to claim 2, wherein said first set of brake system and second set of brake system are respectively provided with front wheel brake wires, the front wheel brake wires are connected to the brake wire base of the front wheel brake, the brake wire base is provided with a first wire bracket and a second wire bracket, respectively; so that each front wheel brake wire can be operated independently, and avoid the front wheel brake wires from interfering with each other.

5. The double linkage safety brake system according to claim 2, wherein said rear wheel brake is provided with a driving block, the driving block is provided with a first through hole and a second through hole; the rear wheel brake wires of the first set of brake system and the second set of brake system are respectively passed through said first through hole and second through hole, respectively; so that each rear wheel brake wire can be operated independently, and avoid the rear wheel brake wires from interfering with each other.

6. The double linkage safety brake system according to claim 2, wherein said front wheel brake is provided with a driving block, the driving block is provided with a first through hole and a second through hole; the front wheel brake wires of the first set of brake system and the second set of brake system are respectively passed through said first through hole and second through hole, respectively; so that each front wheel brake wire can be operated independently, and avoid the rear wheel brake wires from interfering with each other.

* * * * *